United States Patent
Kambe et al.

Patent Number: 5,797,113
Date of Patent: Aug. 18, 1998

[54] METHOD AND SYSTEM FOR DETERMINING TRANSPORTATION ROUTE

[75] Inventors: Nobuhiro Kambe, Tokyo; Akihiro Abe, Yokohama, both of Japan

[73] Assignee: Matsushita Electric Industrial Co., Ltd., Osaka, Japan

[21] Appl. No.: 594,736

[22] Filed: Jan. 31, 1996

[30] Foreign Application Priority Data

Feb. 28, 1995 [JP] Japan ................... 7-063485

[51] Int. Cl.$^6$ ................... G06F 19/00; G01C 21/20
[52] U.S. Cl. ................... 701/201; 701/202; 701/209; 701/210; 340/990; 340/994
[58] Field of Search ................... 364/444.1, 444.2, 364/449.2, 449.3, 449.4, 436; 340/990, 994, 995; 701/201, 202, 209, 210, 204, 203

[56] References Cited

U.S. PATENT DOCUMENTS

| | | | |
|---|---|---|---|
| 4,726,299 | 2/1988 | Anderson | 104/88.02 |
| 4,937,753 | 6/1990 | Yamada | 340/490 |
| 5,168,452 | 12/1992 | Yamada et al. | 364/444.2 |
| 5,369,588 | 11/1994 | Hayami et al | 364/449.3 |
| 5,384,768 | 1/1995 | Fujii | 370/351 |
| 5,502,640 | 3/1996 | Yagyu et al. | 364/443 |
| 5,506,779 | 4/1996 | Kanki | 364/449.3 |
| 5,587,911 | 12/1996 | Asano et al. | 340/995 |
| 5,608,635 | 3/1997 | Tamai | 364/449.3 |

FOREIGN PATENT DOCUMENTS

| | | |
|---|---|---|
| 61-95414 | 5/1986 | Japan . |
| 62-82316 | 4/1987 | Japan . |
| 3-269217 | 11/1991 | Japan . |
| 5-107073 | 4/1993 | Japan . |
| 5-242106 | 9/1993 | Japan . |

OTHER PUBLICATIONS

Atsuhiro Takasu et al, Integration of Knowledge Base and Data and Application to Graph Problem. Information Processing Society, Data Base System No. 53–5, May 19,1986, pp. 1–8.

Jun Shibata et al, Development of Stochastic Route Searching Algorithm, Sumitomo Electric Comp., Sep. 1993, pp. 164–173.

Masami Kato et al, An Optimal Transfer Sequence Scheduling System for the Airline and the Shinkansen Passengers. Information Processing Society, Information System No. 15–2, Ju. 21, 1987, pp. 1–10.

Primary Examiner—Tan Q. Nguyen
Attorney, Agent, or Firm—Lowe Hauptman Gopstein & Berner

[57] ABSTRACT

Transportation network information relating to a transportation network constructed by arranging a plurality of collection/delivery base points, a plurality of transportation hubs, a plurality of collection/delivery services and a plurality of relay transportation services are hierarchically stored in a transportation network storing unit. Schedule information relating to the collection/delivery services and the relay transportation services are stored in a transportation schedule storing unit. Transportation rules based on experimental knowledge, transportation restrictions for the article transportation and route rules based on business knowledge are stored in a knowledge storing unit. When transportation conditions for an article are input to a condition receiving unit, an optimum transportation route from a transportation starting point to a transportation arriving point, a relay of relay transportation services along the optimum transportation route, transportation starting time and date and transportation arriving time and date are determined according to the transportation network information, the schedule information, the transportation rules and restrictions and the route rules. Also, in cases where a transportation starting or arriving point is unknown, candidates of the unknown point are determined and displayed.

15 Claims, 14 Drawing Sheets

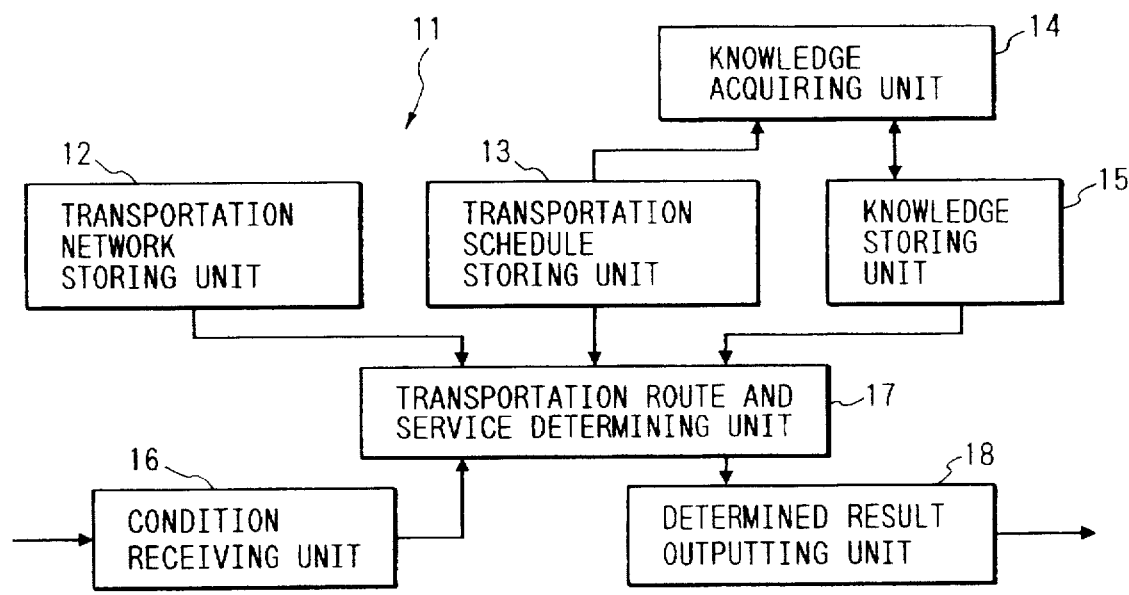
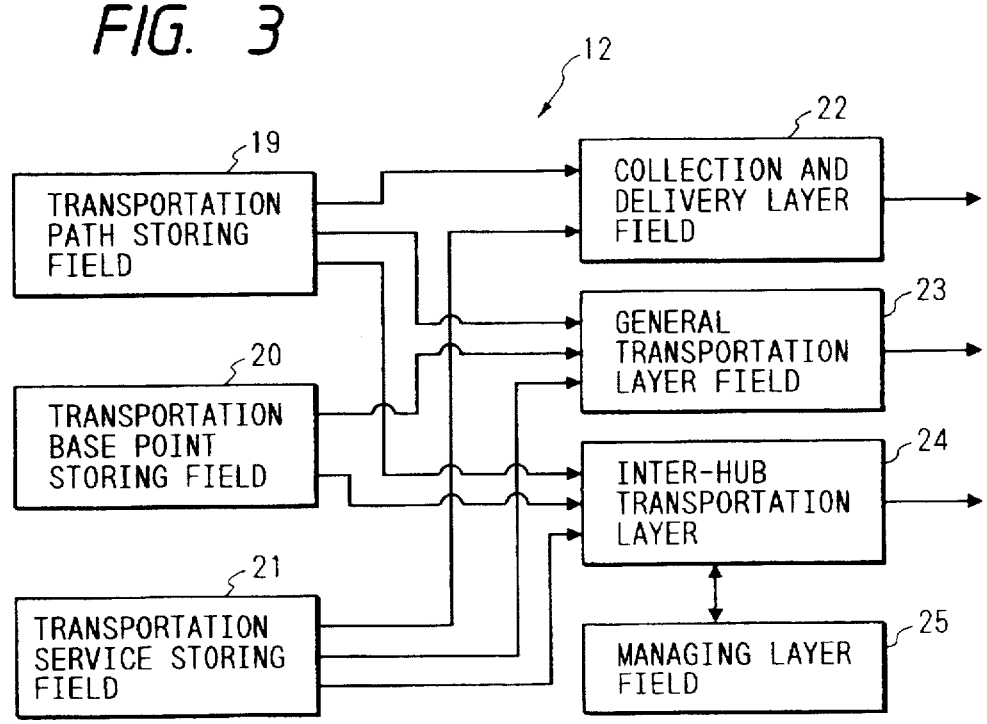

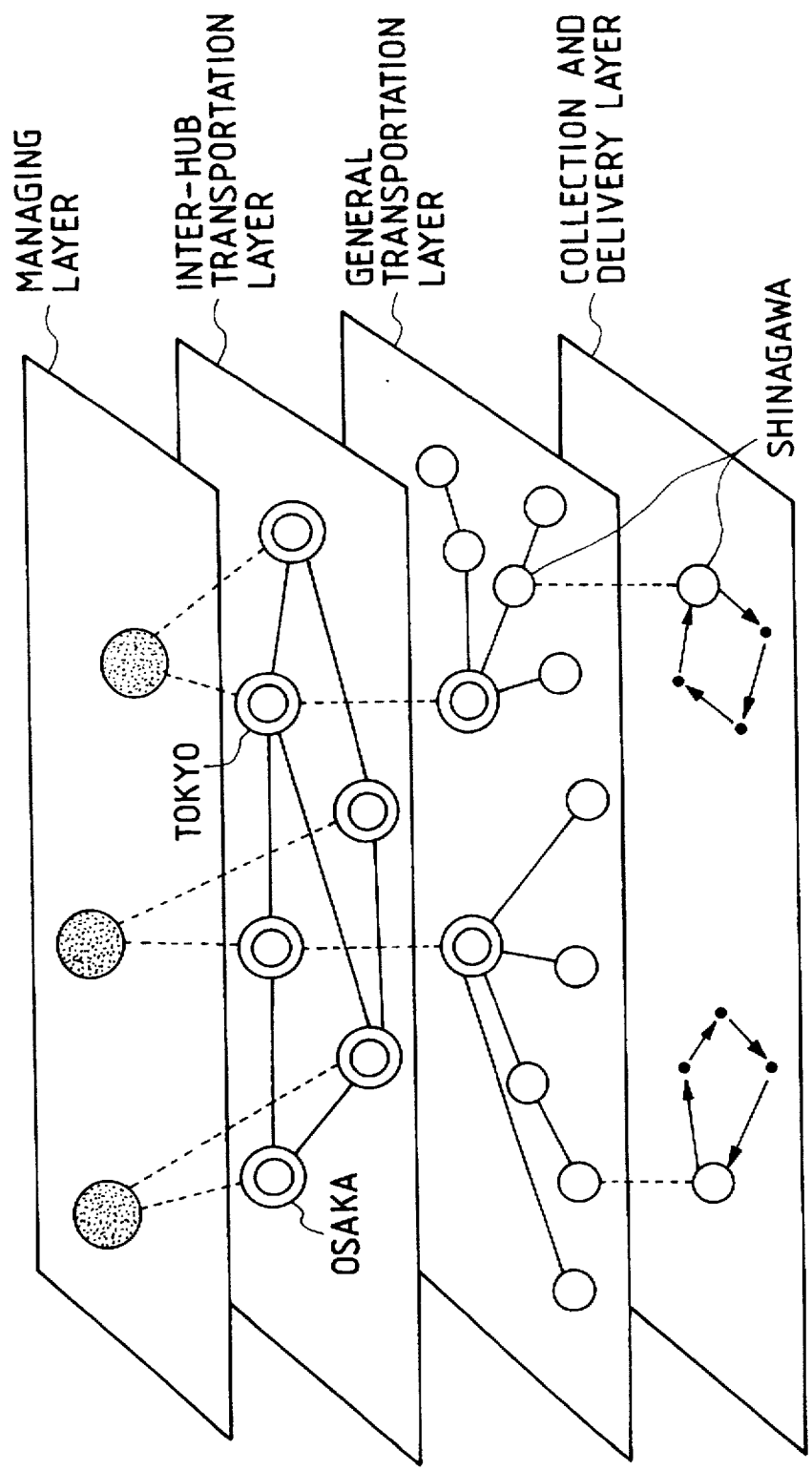

FIG. 4

RELAY TRANSPORTATION SERVICE TABLE

| NAME OF RELAY TRANSPORTATION SERVICE | SERVICE STARTING POINT | SERVICE ARRIVING POINT | SERVICE STARTING TIME | SERVICE ARRIVING TIME |
|---|---|---|---|---|
| RELAY TRANSPORTATION SERVICE 1 | TOKYO | SHINAGAWA | 9:00 | 10:00 |
| RELAY TRANSPORTATION SERVICE 2 | TOKYO | SHINAGAWA | 12:00 | 13:00 |
| | | | | |

COLLECTION AND DELIVERY SERVICE TABLE

| NAME OF COLLECTION/ DELIVERY SERVICE | TRANSPORTATION BASE POINT | SERVICE STARTING TIME | SERVICE ARRIVING TIME |
|---|---|---|---|
| COLLECTION SERVICE 1 | SHINAGAWA | 10:00 | 12:00 |
| DELIVERY SERVICE 2 | SHINAGAWA | 11:00 | 13:00 |
| | | | |

FIG. 5

TRANSPORTATION META-RULE TABLE

| NO. OF TRANSPORTATION META-RULES | TRANSPORTATION CONDITIONS | OPERATION CONTENTS |
|---|---|---|
| RULE 1 | THE NUMBER OF TRANSPORTATION HUBS IN A TRANSPORTATION ROUTE IS EQUAL TO OR MORE THAN FIVE | THE TRANSPORTATION ROUTE IS NOT ADOPTED AS AN INTER-HUB TRANSPORTATION ROUTE |
| RULE 2 | JAPANESE RAILROAD SERVICE AND AIRLINE SERVICE ARE USED TOGETHER ALONG A TRANSPORTATION ROUTE | THE TRANSPORTATION ROUTE IS NOT ADOPTED AS AN INTER-HUB TRANSPORTATION ROUTE |
| | | |

RESTRICTION RULE TABLE

| NO. OF RESTRICTION RULES | TRANSPORTATION CONDITIONS | OPERATION CONTENTS |
|---|---|---|
| RULE 1 | A SERVICE "FOR OKAYAMA" AFTER A TRANSPORTATION SERVICE F | ARTICLE IS TRANSPORTED BY A TRANSPORTATION SERVICE E |
| RULE 2 | DELIVERY OF A SMALL-SIZED ARTICLE ON MONDAY | SUSPENSION OF SERVICE |
| | | |

INTER-HUB TRANSPORTATION ROUTE RULE TABLE

| NO. OF ROUTE RULES | TRANSPORTATION CONDITIONS | OPERATION CONTENTS |
|---|---|---|
| RULE 1 | A ROUTE FROM TOKYO TO OKAYAMA | TOKYO-OSAKA-OKAYAMA |
| RULE 2 | A ROUTE FROM TOKYO TO MORIOKA | TOKYO-SENDAI-MORIOKA |
| | | |

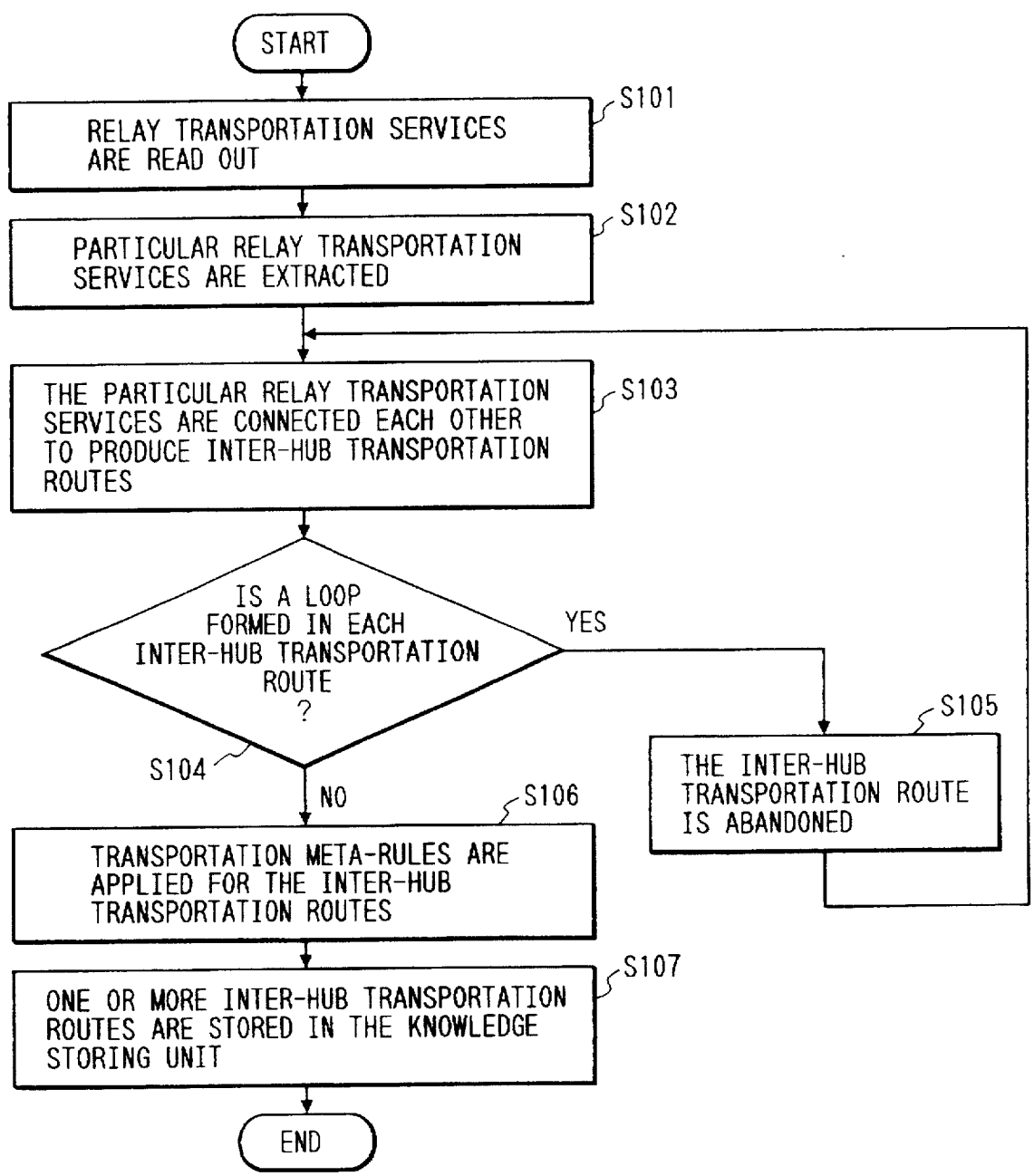

FIG. 7

| | | |
|---|---|---|
| TRANSPORTATION STARTING POINT | → | SHINAGAWA |
| TRANSPORTATION ARRIVING POINT | → | KURUME |
| TRANSPORTATION STARTING DATE | → | DECEMBER 26, 1994 |
| TRANSPORTATION STARTING TIME | → | 20 MINUTES PAST THIRTEEN |
| TRANSPORTATION ARRIVING DATE | → | (UNKNOWN) |
| TRANSPORTATION ARRIVING TIME | → | (UNKNOWN) |
| TYPE OF ARTICLE | → | SMALL SIZE |

FIG. 9

| | | | |
|---|---|---|---|
| TRANSPORTATION STARTING POINT | : SHINAGAWA | TRANSPORTATION ARRIVING POINT | : KURUME |
| TRANSPORTATION STARTING DATE | : DECEMBER 26, 1994 | TRANSPORTATION ARRIVING DATE | : DECEMBER 27, 1994 |
| TRANSPORTATION STARTING TIME | : 25 MINUTES PAST TEN | TRANSPORTATION ARRIVING TIME | : 10 MINUTES PAST TEN |

TYPE OF ARTICLE : SMALL SIZE

TRANSPORTATION ROUTE

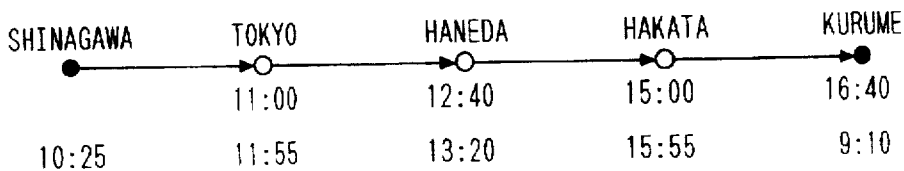

| SHINAGAWA | TOKYO | HANEDA | HAKATA | KURUME |
|---|---|---|---|---|
| | 11:00 | 12:40 | 15:00 | 16:40 |
| 10:25 | 11:55 | 13:20 | 15:55 | 9:10 |

FIG. 11

| | |
|---|---|
| TRANSPORTATION STARTING POINT : SHINAGAWA | TRANSPORTATION ARRIVING POINT : KURUME |
| ALLOWED STARTING DATE : DECEMBER 24, 1994 | TRANSPORTATION ARRIVING DATE : DECEMBER 25, 1994 |
| TIME LIMIT FOR STARTING TIME : 20 MINUTES PAST THIRTEEN | TRANSPORTATION ARRIVING TIME : 10 MINUTES PAST NINE |

TYPE OF ARTICLE : SMALL SIZE

TRANSPORTATION ROUTE

| SHINAGAWA | TOKYO | HANEDA | HAKATA | KURUME |
|---|---|---|---|---|
| | 14:00 | 16:40 | 18:00 | 19:20 |
| 13:20 | 14:55 | 17:20 | 18:30 | 9:10 |

FIG. 13

| | |
|---|---|
| TRANSPORTATION STARTING POINT : SHINAGAWA | |
| TRANSPORTATION STARTING DATE : DECEMBER 26, 1994 | ALLOWED ARRIVING DATE : DECEMBER 26, 1994 |
| TRANSPORTATION STARTING TIME : 10:25 | TIME LIMIT FOR ARRIVING TIME : 15:00 |

TYPE OF ARTICLE : SMALL SIZE

LIST OF TRANSPORTATION ARRIVING POINTS

| TOKYO | AT 13:00 | ON DECEMBER 26, 1994 |
| YOKOHAMA | AT 13:30 | ON DECEMBER 26, 1994 |
| URAWA | AT 14:00 | ON DECEMBER 26, 1994 |
| CHIBA | AT 14:10 | ON DECEMBER 26, 1994 |

FIG. 15

| | |
|---|---|
| | TRANSPORTATION ARRIVING POINT : KURUME |
| TRANSPORTATION STARTING DATE : DECEMBER 26, 1994 | TRANSPORTATION ARRIVING DATE : DECEMBER 27, 1994 |
| TRANSPORTATION STARTING TIME : 14:00 | TRANSPORTATION ARRIVING TIME : 9:10 |

TYPE OF ARTICLE : SMALL SIZE

LIST OF TRANSPORTATION STARTING POINTS

HAKATA    AT  17:00  ON DECEMBER 26, 1994

FUKUOKA   AT  16:30  ON DECEMBER 26, 1994

SAGA      AT  14:50  ON DECEMBER 26, 1994

NAGASAKI  AT  14:00  ON DECEMBER 26, 1994

FIG. 17

| | |
|---|---|
| TRANSPORTATION STARTING POINT : SHINAGAWA | TRANSPORTATION ARRIVING POINT : KURUME |
| TRANSPORTATION STARTING DATE : DECEMBER 24, 1994 | TRANSPORTATION ARRIVING DATE : DECEMBER 27, 1994 |
| TRANSPORTATION STARTING TIME : 10:25 | TRANSPORTATION ARRIVING TIME : 9:10 |

· TYPE OF ARTICLE : SMALL SIZE

· TRANSPORTATION ROUTE

| SHINAGAWA | TOKYO | HANEDA | HAKATA | KURUME |
|---|---|---|---|---|
| | 11:00 | 12:40 | 15:00 | 16:40 |
| 10:25 | 11:55 | 13:20 | 15:55 | 9:10 |

---

| | |
|---|---|
| TRANSPORTATION STARTING DATE : DECEMBER 26, 1994 | TRANSPORTATION ARRIVING DATE : DECEMBER 27, 1994 |
| TIME LIMIT FOR STARTING TIME : 10:25 | TRANSPORTATION ARRIVING TIME : 13:20 |

· TYPE OF ARTICLE : LARGE SIZE

· TRANSPORTATION ROUTE

| SHINAGAWA | HANEDA | HAKATA | KURUME |
|---|---|---|---|
| | 11:20 | 16:30 | 19:00 |
| 10:25 | 14:20 | 16:55 | 13:20 |

METHOD AND SYSTEM FOR DETERMINING TRANSPORTATION ROUTE

BACKGROUND OF THE INVENTION

1. Field of the Invention

The present invention relates generally to transportation route determining method and system in which a physical distribution network is searched for an optimum transportation route of an article, and more particularly to transportation route determining method and system in which a large-scaled physical distribution network is searched for an optimum transportation route of an article.

2. Description of the Related Art

A traffic network and a physical network have been recently developed on a large scale and complicated. Therefore, a control technique for controlling the traffic or physical distribution network by using a computer and a transportation route searching system for searching the network for an optimum route to a destination by using a computer have been developed.

As a conventional route searching technique for a railroad network, a station searching method called a "station spert" of which pronunciation is the same as a word "expert" in Japan (developed in a Bal laboratory) is well-known. In the station searching method, one or more junctions placed between a starting station and a destination and a required time is determined in a all Japan railroad network. Also, a letter "*Integration of Knowledge Base and Data and Application to Graph Problem*" (in Japan) written by Atsuhiro TAKASU, Setsuo OHSUGA, Information Processing Society, Data Base System No. 53-5, May 19, 1986 is well-known. In this letter, a searching technique for searching a Japanese railroad network graphically indicated for a minimum cost route between starting and arriving stations is disclosed.

Also, as a route searching technique for a road network, a technique relating to a route searching algorithm for a car navigation is disclosed in a letter "*Development of Stochastic Route Searching Algorithm*" written by Jun Shibata, Kenji Tenmoku and Hiroshi Shimoura, pp. 164–173, Sumitomo Electric Comp., September 1993. This technique is also disclosed in Published Unexamined Japanese Patent Applications No.S61-095414 (1986), No.S62-082316 (1987) and No.H03-269217 (1991).

Also, as a route searching technique for an airline network, a searching technique for searching a Japanese airline network and a Japanese Shinkansen (denoting a new high-speed railroad) network for a most rapid route to arrive at a destination most rapidly by using one or more airplanes and one or more trains is disclosed in a letter "*An Optimal Transfer Sequence Scheduling System for the Airline and the Shinkansen Passengers*" written by Masami KATO and Keizaburo TAKAGI, Information processing Society, Information System No.15-2, Jul. 21, 1987.

2.1. Previously Proposed Art

Also, as a route searching technique for a physical distribution network, a conventional transportation route determining method is disclosed in a Published Unexamined Japanese Patent Application No.H5-242106. in this method, a particular shipping warehouse, a particular distribution route, a particular delivery at a particular time are determined by using a computer to distribute each of a plurality of ordered commodities to each of a plurality of destinations. That is, a particular distribution and a particular delivery are determined by searching a rule determination table and a distribution delivery determination table according to basic rules that only one route connecting one of warehouses and one of distribution districts is prepared and the distribution districts are not overlapped each other.

2.2. Problems to be Solved by the Invention

However, in the conventional transportation route determining method for a physical distribution network, each of a transportation system, a working system and a transportation condition for a large-scaled physical distribution network in which each of a plurality of articles collected from a plurality of homes and a plurality of stores is delivered to one of a plurality of destinations placed in a wide area is not considered, the conventional transportation route determining method cannot be applied to a method for determining a transportation route in a large-scaled physical distribution network.

Also, various pieces of information such that an article arrives at a destination at what time of a what day, an article must be sent from a starting position until what time to deliver the article at a destination until a desired day or the like are required to manage the article transportation in the large-scaled physical distribution network. However, this requirement cannot be satisfied in the conventional transportation route determining method.

SUMMARY OF THE INVENTION

An object of the present invention is to provide, with due consideration to the drawbacks of such a conventional transportation route determining method, transportation route determining method and system in which an optimum transportation route is reliably and efficiently determined in a large-scaled physical distribution network. Also, the object of the present invention is to provide transportation route determining method and system in which various pieces of information required to manage the article transportation in the large-scaled physical distribution network are automatically presented.

The object is achieved by the provision of a transportation route determining method, comprising the steps of:

constructing a transportation network by arranging a plurality of collection/delivery base points for respectively collecting or delivering a transportation article, a plurality of relay base points for respectively relaying the transportation article to transport the transportation article from a collection/delivery base point to another collection/delivery base point and a plurality of relay transportation services for respectively executing the transportation of the transportation article from one collection/delivery base point or relay base point to another collection/delivery base point or relay base point;

classifying the collection/delivery base points, the relay base points and the relay transportation services of the transportation network into pieces of transportation network information in a hierarchy structure;

preparing a plurality of route rules respectively indicating a relay route connecting three or more relay base points according to business knowledge; and determining a transportation route from a transportation starting point selected from among the collection/delivery base points to a transportation arriving point selected from the collection/delivery base points according to the transportation network information on condition that the route rules are satisfied; and outputting the transportation route.

In the above steps, a transportation network in which a transportation article collected at one of the collection/ delivery base points is transported through one or more relay base points to another collection/delivery base point by a plurality of relay transportation services is constructed. Also, the collection/delivery base points, the relay base points and the relay transportation services of the transportation network are classified into pieces of transportation network information in a hierarchy structure to efficiently read out the transportation network information. Thereafter, a transportation route from one of the collection/delivery base points to another collection/delivery base point is determined according to the transportation network information on condition that the route rules are satisfied.

Accordingly, an optimum transportation route can be reliably and efficiently determined in the transportation network such as a large-scaled physical distribution network.

Also, the object is achieved by the provision of a transportation route determining system, comprising:

transportation network storing means for storing transportation network information relating to a transportation network obtained by classifying a plurality of collection/delivery base points for respectively collecting or delivering a transportation article, a plurality of relay base points for respectively relaying the transportation article to transport the transportation article from a collection/delivery base point to another collection/delivery base point and a plurality of relay transportation services for respectively executing the transportation of the transportation article from one collection/delivery base point or relay base point to another collection/delivery base point or relay base point, which construct the transportation network, in a hierarchy structure;

knowledge storing means for storing a plurality of route rules respectively indicating a relay route connecting three or more relay base points according to business knowledge;

condition receiving means for receiving one or more transportation conditions;

transportation route determining means for determining a transportation route from a transportation starting point corresponding to one of the collection/delivery base points to a transportation arriving point corresponding to another collection/delivery base point according to the transportation conditions received by the condition receiving means and the transportation network information stored in the transportation network storing means on condition that the route rules stored in the knowledge storing means are satisfied; and determined result outputting means for outputting the transportation route determined by the transportation route determining means.

In the above configuration, a transportation network composed of a plurality of collection/delivery base points, a plurality of relay base points and a plurality of relay transportation services is constructed, and pieces of transportation network information relating to the transportation network are obtained by classifying the collection/delivery base points, the relay base points and the relay transportation services. Also, a plurality of route rules are stored in the knowledge storing means. When one or more transportation conditions such as a transportation starting point, a transportation arriving point, a transportation starting date and a transportation arriving date are received by the condition receiving means, an optimum transportation route from the transportation starting point to the transportation arriving point is determined by the transportation route determining means according to the transportation conditions and the transportation network information on condition that the route rules are satisfied.

BRIEF DESCRIPTION OF THE DRAWINGS

The objects, features and advantages of the present invention will be apparent from the following description taken in conjunction with the accompanying drawings, in which:

FIG. 1 is a block diagram of a transportation route determining system in which a transportation route determining method according to an embodiment of the present invention is performed to determine an optimum transportation route;

FIG. 2B shows a hierarchy structure of the transportation network stored in a transportation network storing unit shown in FIG. 1;

FIG. 3 is a block diagram of the transportation network from which path data, base point data and service data are read out;

FIG. 4 shows a relay transportation service table and a collection and delivery service table stored in a transportation schedule storing unit shown in FIG. 1;

FIG. 5 shows a transportation meta-rule table, a restriction rule table and an inter-hub transportation route rule table stored in the knowledge storing unit shown in FIG. 1;

FIG. 6 shows a procedure for producing the practice contents of the inter-hub transportation route rule table;

FIG. 7 shows a plurality of input items and a plurality of transportation conditions received by a condition receiving unit shown in FIG. 1 and displayed on an image plane;

FIG. 9 shows the transportation conditions, the optimum transportation route, the series of relay transportation services and the transportation arriving time and date determined by the procedure shown in FIG. 8;

FIG. 11 shows the transportation conditions, the optimum transportation route, the series of relay transportation services and the transportation starting time and date determined by the procedure shown in FIG. 10;

FIG. 13 shows the transportation conditions, the transportation arriving points and the service arriving times determined by the procedure shown in FIG. 12;

FIG. 15 shows the transportation conditions, the transportation starting points and the service starting times determined by the procedure shown in FIG. 14;

FIG. 17 shows the transportation conditions, the optimum transportation route, the series of relay transportation services and the transportation arriving time and date determined for each type transportation article by the procedure shown in FIG. 16.

DETAIL DESCRIPTION OF THE EMBODIMENTS

Figure 2A:
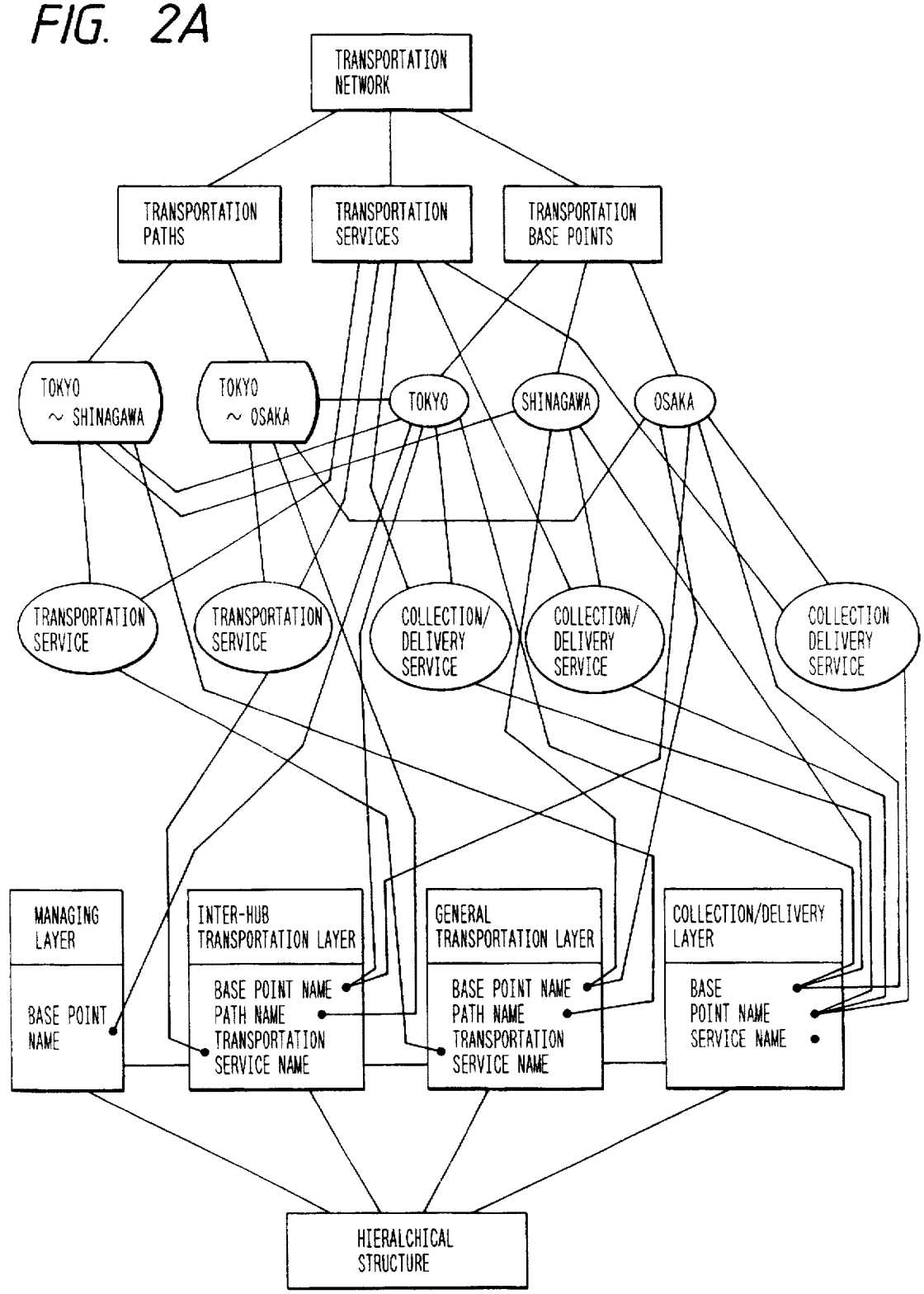
FIG. 2A shows transportation base points, transportation paths connecting the base points and transportation services executed through the paths composing a transportation network stored in a transportation network storing unit shown in FIG. 1.

Preferred embodiments of transportation route determining method and system according to the present invention are described with reference to drawings.

FIG. 1 is a block diagram of a transportation route determining system in which a transportation route determining method according to an embodiment of the present invention is performed to determine an optimum transportation route.

As shown in FIG. 1, a transportation route determining system 11 comprises:

- a transportation network storing unit 12 for storing pieces of network information relating to a transportation network such as a large-scaled physical distribution network;
- a transportation schedule storing unit 13 for storing pieces of schedule information relating to a transportation schedule in the transportation network;
- a knowledge acquiring unit 14 for acquiring one or more pieces of schedule information, stored in the transportation schedule storing unit 13, required as transportation service knowledge;
- a knowledge storing unit 15 for storing a plurality of transportation rules determined according to experimental knowledge obtained in the past transportation route determination, a plurality of transportation restrictions for the article transportation in the transportation network and a plurality of route rules which are determined according to business knowledge based on the schedule information acquired by the knowledge acquiring unit 14;
- a condition receiving unit 16 for receiving a plurality of transportation conditions such as a transportation starting point, a transportation arriving point, a transportation starting date, a transportation starting time, a transportation arriving date, a transportation arriving time and a type of a delivered article;
- a transportation route and service determining unit 17 for determining a transportation route from the transportation starting point to the transportation arriving point and a relay of transportation services along the transportation route according to the network information stored in the transportation network storing unit 12, the schedule information stored in the transportation schedule storing unit 13, the knowledge information stored in the knowledge storing unit 15 and the transportation conditions received by the condition receiving unit 16; and
- a determined result outputting unit 18 for outputting the transportation route, the transportation service, the transportation starting date and the transportation arriving date determined by the transportation route and service determining unit 17.

As shown in FIG. 2A, the transportation network stored in the transportation network storing unit 12 is composed of a plurality of transportation base points through which a plurality of articles are transported, a plurality of transportation paths respectively connecting a pair of transportation base points, and a plurality of transportation services for respectively executing the article transportation on each of the transportation paths. The transportation base points are classified into a plurality of collection/delivery base points such as Shinagawa (Japanese place name) and a plurality of transportation relay base points (or transportation hubs) such as Tokyo and Osaka (Japanese place name). Each of the collection/delivery base points is used for the collection and delivery of transportation articles in a transportation district, and each of the transportation relay points relays an article collected by one of collection/delivery base points placed at a transportation region to transport the article to another collection/delivery base point placed at another transportation region. The transportation services are classified into a plurality of collection and delivery services for respectively performing the collection and delivery of articles from/to homes and stores placed in a transportation district and a plurality of relay transportation services for relaying the transportation of the articles.

The transportation network is managed by classifying the transportation paths, the transportation services and the transportation base points into four types of transportation network information arranged at four hierarchical layers of a hierarchy structure. That is, as shown in FIG. 2B, the hierarchy structure is composed of a collection and delivery layer at which collection/delivery layer information relating to the collection and delivery of articles at the collection/ delivery base points is hierarchically arranged, a general transportation layer at which general transportation layer information relating to the general transportation between a transportation hub and a group of general transportation base points placed at a transportation hub region is hierarchically arranged, an inter-hub transportation layer at which inter-hub transportation layer information relating to the transportation among the transportation hubs is hierarchically arranged, and a managing layer at which managing layer information relating to the management of the transportation hubs performed while considering a correlation among the transportation hubs according to geographical conditions and managerial conditions of the transportation hubs is hierarchically arranged.

As shown in FIG. 3, the transportation network storing unit 12 comprises a transportation path storing field 19 for storing pieces of path data indicating the transportation paths of the network, a transportation base point storing field 20 for storing pieces of base point data indicating the transportation base points, and a transportation service storing field 21 for storing pieces of service data indicating the transportation services. Also, to efficiently read out the data stored in the storing fields of the unit 12, the unit 12 further comprises a collection and delivery layer field 22 for temporarily holding the collection/delivery layer information hierarchically arranged at the collection and delivery layer, a general transportation layer field 23 for temporarily holding the general transportation layer information hierarchically arranged at the general transportation layer, an inter-hub transportation layer field 24 for temporarily holding the inter-hub transportation layer information hierarchically arranged at the inter-hub transportation layer, and a managing layer field 25 for temporarily holding the managing layer information hierarchically arranged at the managing layer.

For example, names of the transportation base points belonging to the base point data stored in the transportation base point storing field 20 and names of the collection and delivery services belonging to the service data stored in the transportation service storing field 21 are read out through the collection and delivery layer field 22 as the collection/delivery layer information. Names of the transportation base points belonging to the base point data stored in the transportation base point storing field 20, names of the transportation paths belonging to the path data stored in the transportation path storing field 19 and names of the transportation services belonging to the service data stored in the transportation service storing field 21 are read out through the general transportation layer field 23 as the general transportation layer information. Names of the transportation hubs belonging to the base point data stored in the transportation base point storing field 20, names of the transportation paths belonging to the path data stored in the field 19 and names of the transportation services belonging to the service data stored in the field 21 are read out through the inter-hub transportation layer field 24 as the inter-hub transportation layer information.

In the transportation schedule storing unit 13, as shown in FIG. 4, a relay transportation service table in which a transportation schedule of a plurality of relay transportation services is listed and a collection and delivery service table in which a transportation schedule of a plurality of collection and delivery services is listed are stored. Each of the relay transportation services listed in the relay transportation service table is specified by a name of a relay transportation service written in a name column C1, a service starting point of the transportation service written in a starting point column C2, a service arriving point of the transportation service written in an arriving point column C3, a service starting time of the transportation service written in a starting time column C4 and a service arriving time of the transportation service written in an arriving time column C5. Each of the collection and delivery services listed in the collection and delivery service table is specified by a name of a collection or delivery service written in a name column C6, a name of a transportation base point written in a base point name column C7, a service starting time of the collection or delivery service from the transportation base point written in a starting time column C8 and a service arriving time of the collection or delivery service at the transportation base point written in an arriving time column C9.

In the knowledge storing unit 15, as shown in FIG. 5, a transportation meta-rule table in which a plurality of transportation meta-rules determined according to the experimental knowledge are listed, a restriction rule table in which a plurality of restriction rules determined according to the transportation restrictions are listed and an inter-hub transportation route rule table in which a plurality of route rules determined according to the business knowledge are listed are stored. Each of the transportation meta-rules indicates a condition for a transportation route connecting two or more transportation hubs. Each of the restriction rules indicates a restriction for a transportation service between a pair of transportation hubs, a collection service or a delivery service. Each of the route rules indicates an optimum transportation route connecting three or more transportation hubs. Each of the rules listed in the tables is specified by the number of the rule written in a rule number column C10, C13 or C16, a transportation condition written in a condition column C11, C14 or C17 and operation contents written in a operation column C12, C15 or C18. The operation contents written in the operation column C18 of the inter-hub transportation route rule table are produced according to the relay transportation services listed in the relay transportation service table of the transportation schedule storing unit 13. The procedure for producing the operation contents of the inter-hub transportation route rule table is shown in FIG. 6.

As shown in FIG. 6, the relay transportation services listed in the relay transportation service table of the transportation schedule storing unit 13 are read out to the knowledge acquiring unit 14 in a step S101. Thereafter, a plurality of particular relay transportation services which each have a transportation hub as a transportation starting point written in the starting point column C2 and another transportation hub as a transportation arriving point written in the arriving point column C3 are extracted from the relay transportation services in a step S102.

Thereafter, in a step S103, a particular relay transportation service having a particular transportation hub as a transportation starting point and another particular relay transportation service having the same particular transportation hub as a transportation arriving point are connected each other. This connection is performed for all particular relay transportation services, and one or more inter-hub transportation routes which each are produced by connecting two or more particular transportation hubs are produced.

In a step S104, it is checked whether or not a plurality of transportation starting and arriving points in each of the inter-hub transportation routes are the same transportation hub. In cases where a plurality of transportation starting and arriving points in a particular inter-hub transportation route are the same transportation hub, the particular inter-hub transportation route is abandoned in a step S105 because a loop is formed in the particular inter-hub transportation route. In contrast, in cases where a plurality of transportation starting and arriving points in the particular inter-hub transportation route are not the same transportation hub, the transportation meta-rules listed in the transportation meta-rule table of the knowledge storing unit 15 are applied for the particular inter-hub transportation route in a step S106. In cases where it is judged that the particular inter-hub transportation route is not adopted according to one of the rules, the particular inter-hub transportation route is abandoned. In contrast, in cases where it is judged that the particular inter-hub transportation route is adopted according to the transportation meta-rules, the particular inter-hub transportation route is stored in the knowledge storing unit 15 in a step S107. Therefore, one or more inter-hub transportation routes are produced and stored in the unit 15 according to the relay transportation services of the transportation schedule storing unit 13 and the rules listed in the transportation meta-rule table of the knowledge storing unit 15.

In the condition receiving unit 16, as shown in FIG. 7, a plurality of input items are displayed on a image plane, and a plurality of transportation conditions such as a transportation starting point, a transportation arriving point, a transportation starting date, a transportation starting time, a transportation arriving date, a transportation arriving time and a type of a delivered article are input as the input items by an operator. In this case, it is not necessary to fill all input items. That is, an input item not filled by the operator is treated as an undecided transportation condition, and the undecided transportation condition is determined in the transportation route and service determining unit 17.

In the transportation route and service determining unit 17, an optimum transportation route is determined according to the transportation conditions received by the condition receiving unit 16 while referring the network information stored in the transportation network storing unit 12, the schedule information stored in the transportation schedule storing unit 13 and the knowledge information stored in the knowledge storing unit 15.

The operation performed by the determining unit 17 is described with reference to FIGS. 8 to 17.

Figure 8:
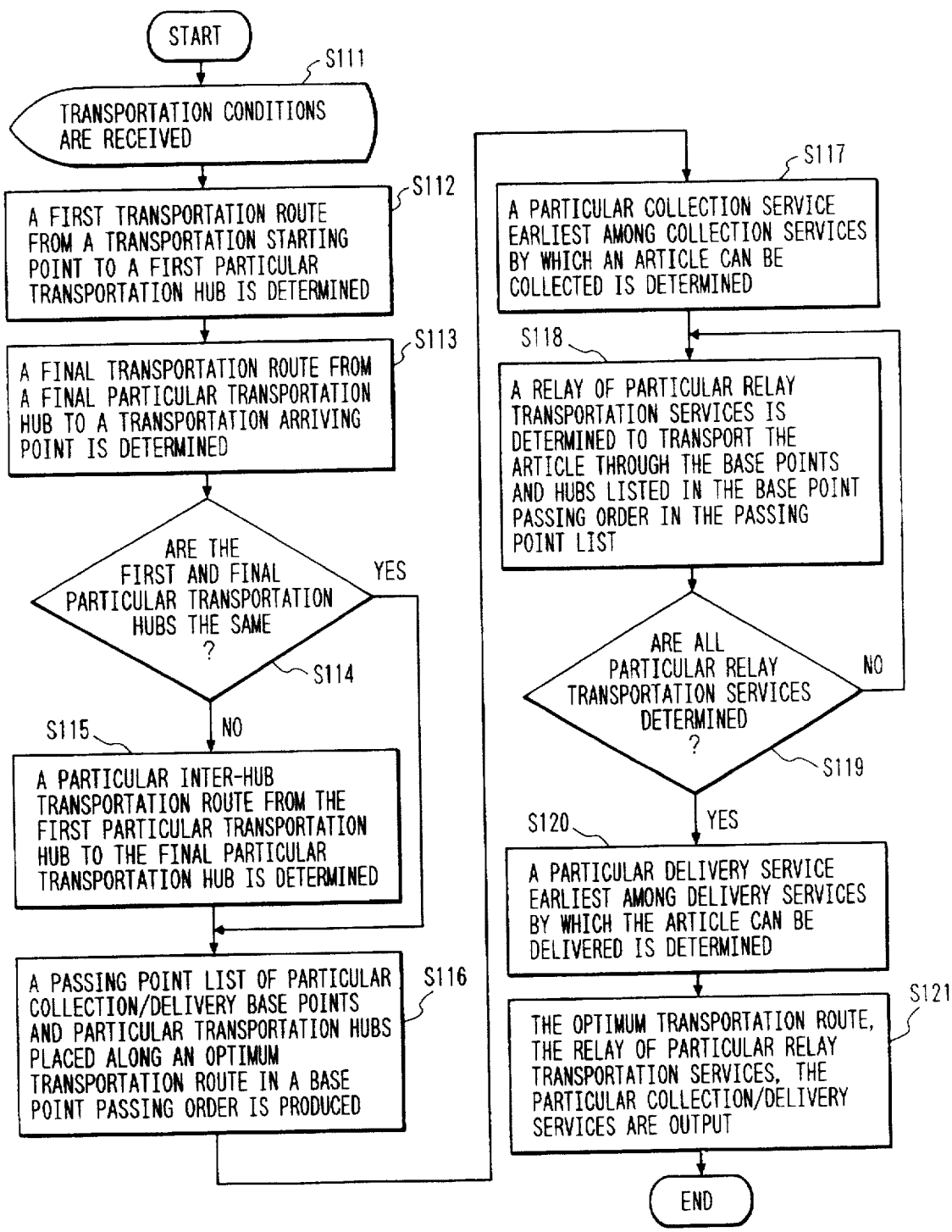
FIG. 8 is a flow chart showing the procedure for determining an optimum transportation route, a series of relay transportation services and transportation arriving time and date in a transportation route and service determining unit shown in FIG. 1.

In cases where a transportation starting point, a transportation arriving point, a desired transportation starting date, a desired transportation starting time and a type of a transportation article are received by the condition receiving unit 16 on condition that a transportation arriving date and a transportation arriving time are treated as undecided transportation conditions, an optimum transportation route from the transportation starting point to the transportation arriving point and a group of particular transportation services connecting from the transportation starting point to the transportation arriving point are determined according to a procedure shown in FIG. 8. Also, a transportation arriving date and a transportation arriving time are determined in addition.

As shown in FIG. 8, when the transportation conditions are received by the unit 16 in a step S111, a first particular transportation hub to which the transportation article is transported from the transportation starting point is determined according to the network information stored in the transportation network storing unit 12 while considering the type of the delivered article because the determination of the first particular transportation hub changes in dependence on the article type, and a first transportation route from the transportation starting point to the first particular transportation hub is determined in a step S112.

In a step S113, a final particular transportation hub from which the transportation article is transported to the transportation arriving point is determined according to the network information stored in the transportation network storing unit 12 while considering the type of the delivered article, and a final transportation route from the final particular transportation hub to the transportation arriving point is determined.

In a step S114, it is judged whether or not the first and final particular transportation hubs are the same. In cases where the first particular transportation hub differs from the final particular transportation hub, a particular inter-hub transportation route from the first particular transportation hub to the final particular transportation hub is determined in a step S115 by referring the inter-hub transportation route table of the knowledge storing unit 15, and the procedure proceeds to a step S116. Therefore, an optimum transportation route is determined by connecting the first transportation route, the particular inter-hub transportation route and the final transportation route in series in that order. In contrast, in cases where the first and final particular transportation hubs are the same, an optimum transportation route is determined by connecting the first transportation route, the particular inter-hub transportation route and the final transportation route in series. Thereafter, the procedure jumps to the step S116 because it is unnecessary to determine any inter-hub transportation route.

In the step S116, a passing point list in which one or more particular collection/delivery base points placed on the first particular transportation route, one or more particular collection/delivery base points placed on the final particular transportation route and a plurality of particular transportation hubs placed on the particular inter-hub transportation route are listed in a base point passing order along the optimum transportation route is produced, or a passing point list in which one or more particular collection/delivery base points placed on the first particular transportation route and one or more particular collection/delivery base points placed on the final particular transportation route are listed in a base point passing order along the optimum transportation route is produced.

In a step S117, the collection and delivery service table of the transportation schedule storing unit 13 is searched for a particular collection service while referring the restriction rule table of the knowledge storing unit 15 on condition that the particular collection service is earliest among collection services by which the transportation article can be collected after the transportation starting date and time received as the transportation conditions by the condition receiving unit 16.

In a step S118, the relay transportation service table of the transportation schedule storing unit 13 is searched for a relay of particular relay transportation services while referring the service starting and arriving times written in the relay transportation service table of the transportation schedule storing unit 13 and the restriction rule table of the knowledge storing unit 15 on condition that the transportation article is transported by the relay of particular relay transportation services from the particular collection base point to the particular delivery base point through the particular transportation hubs listed in the passing point list in the base point passing order. In this case, the particular relay transportation services are determined one after another to follow the particular transportation hubs in the base point passing order. Also, a time difference between a service arriving time of a former particular relay transportation service and a service starting time of a latter particular relay transportation service executed in succession to the former particular relay transportation service is set to be as small as possible.

In a step S119, it is judged whether or not all particular relay transportation services from the transportation starting point to the transportation arriving point are determined. In cases where all particular relay transportation services are determined, the procedure proceeds to a step S120.

In the step S120, the collection and delivery service table of the transportation schedule storing unit 13 is searched for a particular delivery service while referring the restriction rule table of the knowledge storing unit 15 on condition that the particular delivery service is earliest among delivery services by which the transportation article transported to the transportation arriving point by one of the particular relay transportation services can be delivered. Therefore, a series of particular relay transportation services and the particular collection and delivery services are determined, and a transportation arriving date and a transportation arriving time are determined.

In a step S121, the transportation conditions received by the condition receiving unit 16, the optimum transformation route, the particular collection/delivery base points, the particular transportation hubs, the series of particular relay transportation services, the particular collection and delivery services and the transportation arriving date and time at the transportation arriving points are transferred to the determined result outputting unit 18.

In the determining unit 18, as shown in FIG. 9, the transportation conditions, the optimum transformation route, the particular collection/delivery base points, the particular transportation hubs, the series of particular relay transportation service, the particular collection and delivery services and the transportation arriving date and time are display on an image plane.

Figure 10:
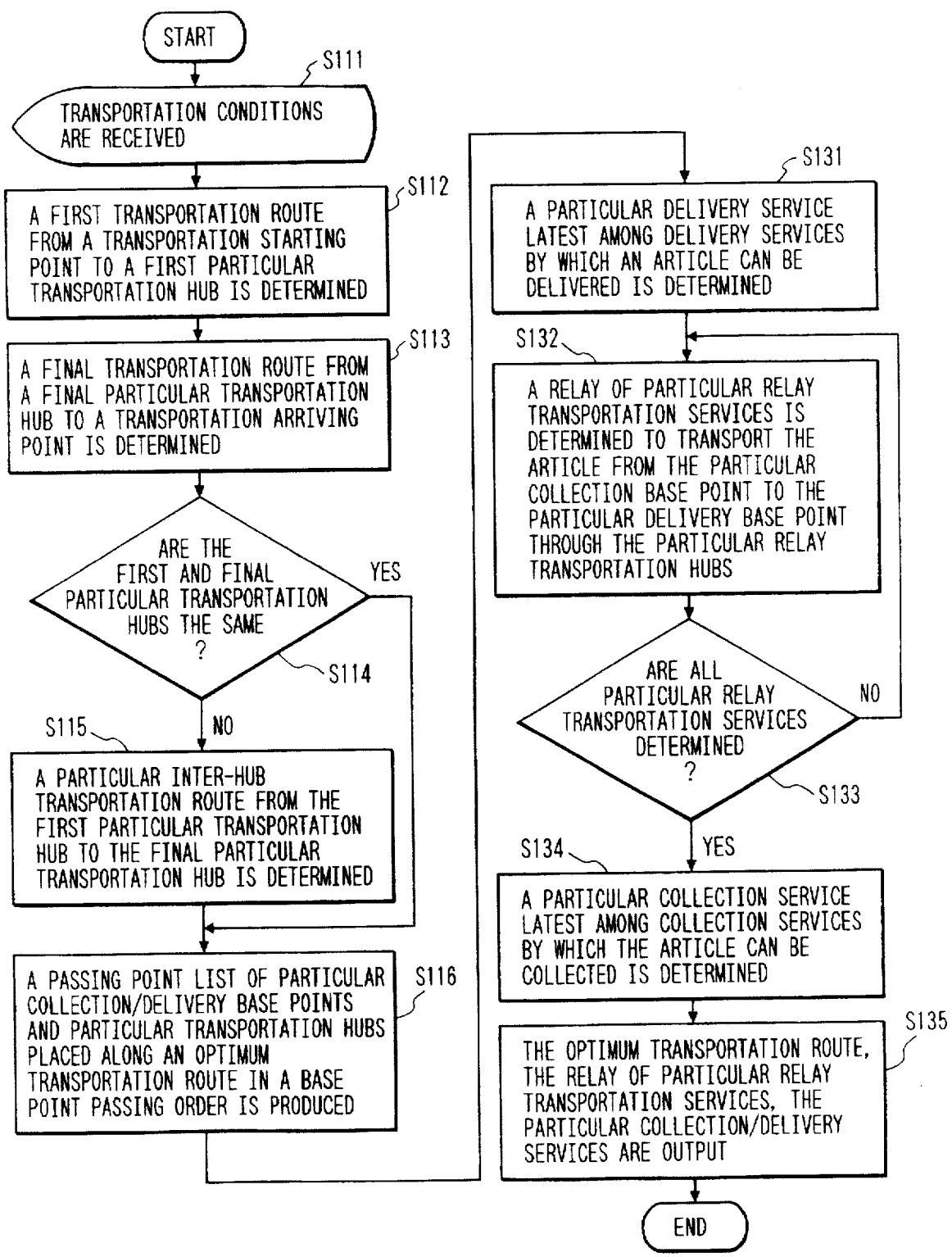
FIG. 10 is a flow chart showing the procedure for determining an optimum transportation route, a series of relay transportation services and transportation starting time and date in the transportation route and service determining unit shown in FIG. 1.

Also, in cases where a transportation starting point, a transportation arriving point, a desired transportation arriving date, a desired transportation arriving time and a type of a transportation article are received by the condition receiving unit 16 on condition that a transportation starting date and a transportation starting time are treated as undecided transportation conditions, an optimum transportation route from the transportation starting point to the transportation arriving point and a group of particular transportation services connecting from the transportation starting point to the transportation arriving point are determined according to a procedure shown in FIG. 10. Also, a transportation starting date and a transportation starting time are determined in addition.

As shown in FIG. 10, the procedure from the step S111 to the step S116 is performed in the same manner as that shown in FIG. 8. Therefore, an optimum transportation route from the transportation starting point to the transportation arriving point is determined, and a passing point list is produced.

Thereafter, in a step S131, the collection and delivery service table of the transportation schedule storing unit 13 is searched for a particular delivery service while referring the restriction rule table of the knowledge storing unit 15 on condition that the particular delivery service is latest among delivery services by which the transportation article can be delivered until the transportation arriving date and time received as the transportation conditions by the condition receiving unit 16.

In a step S132, the relay transportation service table of the transportation schedule storing unit 13 is searched for a relay of particular relay transportation services while referring the service starting and arriving times written in the relay transportation service table of the transportation schedule storing unit 13 and the restriction rule table of the knowledge storing unit 15 on condition that the transportation article is transported by the relay of particular relay transportation services from the particular collection base point to the particular delivery base point through the particular transportation hubs listed in the passing point list in the base point passing order. In this case, the particular relay transportation services are determined one after another to follow the particular transportation hubs inversely to the base point passing order. Also, a time difference between a service arriving time of a former particular relay transportation service and a service starting time of a latter particular relay transportation service executed in succession to the former particular relay transportation service is set to be as small as possible.

In a step S133, it is judged whether or not all particular relay transportation services from the transportation starting point to the transportation arriving point are connected. In cases where all particular relay transportation services are determined, the procedure proceeds to a step S134.

In the step S134, the collection and delivery service table of the transportation schedule storing unit 13 is searched for a particular collection service while referring the restriction rule table of the knowledge storing unit 15 on condition that the particular collection service is latest among collection services which can be connected to a particular relay transportation service of which the service starting point is the transportation starting point. Therefore, a series of particular relay transportation services and the particular collection and delivery services is determined, and a transportation starting date and a transportation starting time are determined.

In a step S135, the transportation conditions received by the condition receiving unit 16, the optimum transformation route, the particular collection/delivery base points, the particular transportation hubs, the series of particular relay transportation service, the particular collection and delivery services and the transportation starting date and time are transferred to the determined result outputting unit 18.

In the outputting unit 18, as shown in FIG. 11, the transportation conditions, the optimum transformation route, the particular collection/delivery base points, the particular transportation hubs, the series of particular relay transportation service, the particular collection and delivery services and the transportation starting date and time are display on an image plane. In this case, the transportation starting date is displayed as an allowed starting date, and the transportation starting time determined is displayed as a time limit for the transportation starting time.

Figure 12:
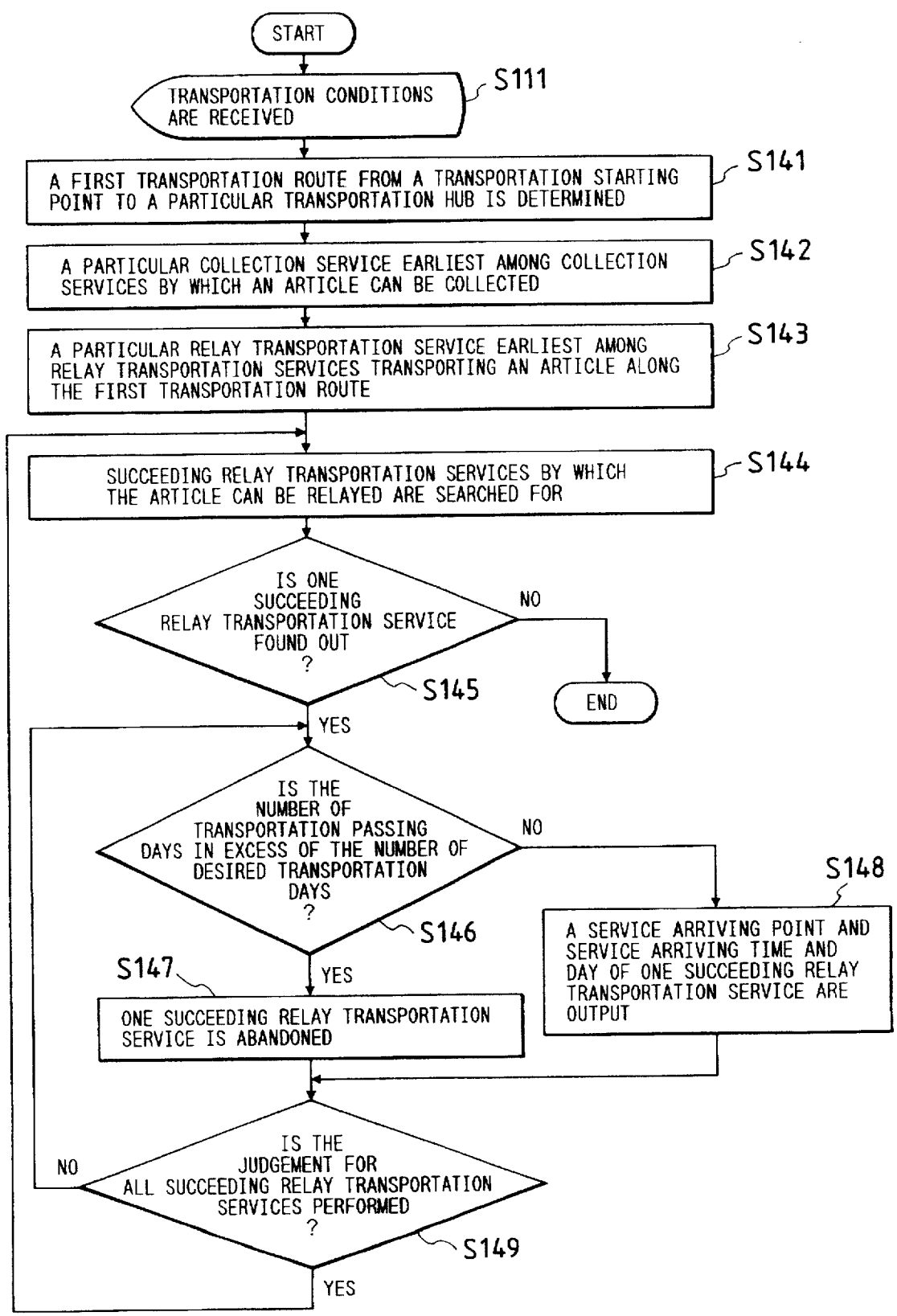
FIG. 12 is a flow chart showing the procedure for determining a plurality of transportation arriving points and a plurality of service arriving times at the transportation arriving points in the transportation route and service determining unit shown in FIG. 1.

Also, in cases where a transportation starting point, a desired transportation starting date, a desired transportation starting time, a desired transportation arriving date, and a type of a transportation article are received by the condition receiving unit 16 on condition that a transportation arriving point and a transportation arriving time are treated as undecided transportation conditions, one or more transportation arriving points at which the transportation article can be delivered until the desired transportation arriving date and one or more service arriving times of particular relay transportation services at the transportation arriving points determined are determined according to a procedure shown in FIG. 12. In this case, the number of desired transportation days from the desired transportation starting date to the desired transportation arriving date is initially given.

As shown in FIG. 12, after the procedure of the step S111 is performed in the same manner as that shown in FIG. 8, a particular transportation hub to which the transportation article is transported from the transportation starting point is determined according to the network information stored in the transportation network storing unit 12 while considering the type of the delivered article, and a first transportation route from the transportation starting point to the particular transportation hub is determined in a step S141.

In a step S142, the collection and delivery service table of the transportation schedule storing unit 13 is searched for a particular collection service while referring the restriction rule table of the knowledge storing unit 15 on condition that the particular collection service is earliest among collection services by which the transportation article can be collected after the transportation starting date and time received as the transportation conditions by the condition receiving unit 16. Therefore, the transportation article is transported to the transportation starting point at a service arriving time of the particular collection service.

In a step S143, the relay transportation service table of the transportation schedule storing unit 13 is searched for a particular relay transportation service while referring the service starting and arriving times written in the relay transportation service table of the transportation schedule storing unit 13 and the restriction rule table of the knowledge storing unit 15 on condition that a service starting time of the particular relay transportation service is later than the service arriving time of the particular collection service and the particular relay transportation service is earliest among relay transportation services by which the transportation article can be transported from the transportation starting point to the particular transportation hub. Therefore, the transportation article is transported to the particular transportation hub at a service arriving time of the particular relay transportation service.

In a step S144, the relay transportation service table of the transportation schedule storing unit 13 is searched for one or more succeeding relay transportation services while referring the service starting and arriving times written in the relay transportation service table of the transportation schedule storing unit 13 and the restriction rule table of the knowledge storing unit 15 on condition that a service starting point of each of the succeeding relay transportation services is the particular transportation hub latest determined and a service starting time of each of the succeeding relay transportation services is later than the service arriving time of the particular relay transportation service latest determined to relay the transportation article.

In a step S145, it is judged whether or not at least one succeeding relay transportation service is found out. In cases where one or more succeeding relay transportation services are found out, it is judged in a step S146 whether or not a service arriving day of one succeeding relay transportation service is after the desired transportation arriving date received by the condition receiving unit 16. In other words, it is judged in the step S146 whether or not the number of transportation passing days from the desired transportation starting date to the service arriving day of one succeeding relay transportation service is in excess of the number of desired transportation days.

In cases where a service arriving day of one succeeding relay transportation service is after the desired transportation arriving date, the succeeding relay transportation service is abandoned in a step S147, and the procedure proceeds to a step S149. In contrast, in cases where a service arriving day of one succeeding relay transportation service is not after the desired transportation arriving date, the succeeding relay transportation service is adopted, and a service arriving point and service arriving time and day of the succeeding relay transportation service are transferred to the determined result outputting unit 18 in a step S148. Thereafter, the service arriving point of the succeeding relay transportation service adopted is treated as a particular transportation hub or a particular collection/delivery base point latest determined, and the procedure proceeds to the step S149.

In the step S149, it is judged whether or not the judgement for all succeeding relay transportation services found out in the step S144 is performed in the step S146. In cases where the judgement for all succeeding relay transportation services is not performed, the judgement for another service arriving day of another succeeding relay transportation service is performed in the step S146. In contrast, in cases where the judgement for all succeeding relay transportation services is performed, the procedure returns to the step S144, and one or more succeeding relay transportation services are searched for.

In cases where it is judged in the step S145 that any succeeding relay transportation service is not found out, the procedure is finished.

Therefore, one or more particular relay transportation services which each are latest determined at each of one or more series of particular relay transportation services, one or more transportation routes respectively corresponding to a series of particular relay transportation services are obtained. Also, one or more transportation arriving points are indicated by the service arriving points of the particular relay transportation services latest determined which are treated as one or more particular transportation hubs or particular collection/delivery base points latest determined.

In the outputting unit 18, as shown in FIG. 13, the transportation conditions received, the transportation arriving points indicated by the particular transportation hubs or particular collection/delivery base points latest determined and the service arriving time and date of each particular relay transportation service latest determined are display on an image plane.

Figure 14:
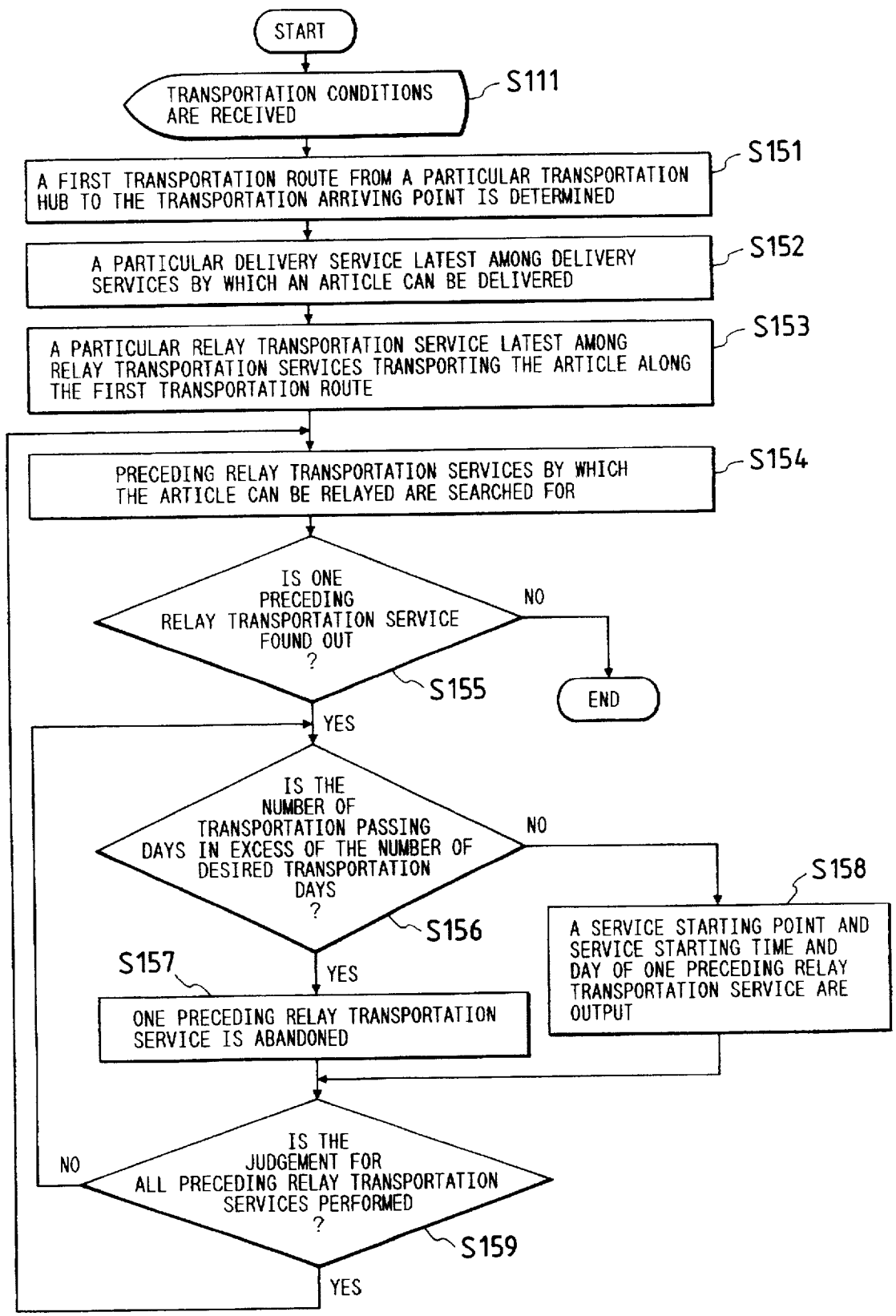
FIG. 14 is a flow chart showing the procedure for determining a plurality of transportation starting points and a plurality of service starting times at the transportation starting points in the transportation route and service determining unit shown in FIG. 1.

Also, in cases where a transportation arriving point, a desired transportation arriving date, a desired transportation arriving time, a desired transportation starting date, and a type of a transportation article are received by the condition receiving unit 16 on condition that a transportation starting point and a transportation starting time are treated as undecided transportation conditions, one or more transportation starting points from which the transportation article can be delivered to the transportation arriving point until the desired transportation arriving time and date and one or more service starting times of particular relay transportation services from the transportation starting points determined are determined according to a procedure shown in FIG. 14. In this case, the number of desired transportation days from the desired transportation starting date to the desired transportation arriving date is initially given.

As shown in FIG. 14, after the procedure of the step S111 is performed in the same manner as that shown in FIG. 8, a particular transportation hub from which the transportation article is transported to the transportation arriving point is determined according to the network information stored in the transportation network storing unit 12 while considering the type of the delivered article, and a transportation route from the particular transportation hub to the transportation arriving point is determined in a step S151.

In a step S152, the collection and delivery service table of the transportation schedule storing unit 13 is searched for a particular delivery service while referring the restriction rule table of the knowledge storing unit 15 on condition that the particular delivery service is latest among delivery services by which the transportation article can be delivered until the transportation arriving date and time received as the transportation conditions by the condition receiving unit 16. Therefore, it is required that the transportation article is transported to the transportation arriving point until a service starting time of the particular delivery service.

In a step S153, the relay transportation service table of the transportation schedule storing unit 13 is searched for a particular relay transportation service while referring the service starting and arriving times written in the relay transportation service table of the transportation schedule storing unit 13 and the restriction rule table of the knowledge storing unit 15 on condition that a service arriving time of the particular relay transportation service is earlier than the service starting time of the particular delivery service and the particular relay transportation service is latest among relay transportation services performed along the first transportation route. Therefore, it is required that the transportation article is transported to the particular transportation hub until a service starting time of the particular relay transportation service.

In a step S154, the relay transportation service table of the transportation schedule storing unit 13 is searched for one or more preceding relay transportation services while referring the service starting and arriving times written in the relay transportation service table of the transportation schedule storing unit 13 and the restriction rule table of the knowledge storing unit 15 on condition that a service arriving point of each of the preceding relay transportation services is the particular transportation hub latest determined and a service arriving time of each of the preceding relay transportation services is earlier than the service starting time of the particular relay transportation service latest determined.

In a step S155, it is judged whether or not at least one preceding relay transportation service is found out. In cases where one or more preceding relay transportation services are found out, it is judged in a step S156 whether or not a service starting day of one preceding relay transportation service is before the desired transportation starting date received by the condition receiving unit 16. In other words, it is judged in the step S156 whether or not the number of transportation passing days from a service starting day of one preceding relay transportation service to the desired transportation arriving date is in excess of the number of desired transportation days.

In cases where a service starting day of one preceding relay transportation service is before the desired transportation starting date, the preceding relay transportation service is abandoned in a step S157, and the procedure proceeds to a step S159. In contrast, in cases where a service starting day of one preceding relay transportation service is not before the desired transportation starting date, the preceding relay transportation service is adopted, and a service starting point and service starting time and day of the preceding relay transportation service are transferred to the determined result outputting unit 18 in a step S158. Thereafter, the service starting point of the preceding relay transportation service adopted is treated as a particular transportation hub or a particular collection/delivery base point latest determined, and the procedure proceeds to the step S159.

In the step S159, it is judged whether or not the judgement for all preceding relay transportation services found out in the step S154 is performed in the step S156. In cases where the judgement for all preceding relay transportation services is not performed, the judgement for another service starting day of another preceding relay transportation service is performed in the step S156. In contrast, in cases where the judgement for all preceding relay transportation services is performed, the procedure returns to the step S154, and one or more preceding relay transportation services are searched for.

In cases where it is judged in the step S155 that any preceding relay transportation service is not found out, the procedure is finished.

Therefore, one or more particular relay transportation services which each are latest determined at each of one or more series of particular relay transportation services, one or more transportation routes respectively corresponding to a series of particular relay transportation services are obtained. Also, one or more transportation starting points are indicated by the service starting points of the particular relay transportation services latest determined which are treated as one or more particular transportation hubs or particular collection/delivery base points latest determined.

In the outputting unit 18, as shown in FIG. 15, the transportation conditions received, the transportation starting points indicated by the particular transportation hubs or particular collection/delivery base points latest determined and the service starting time and date of each particular relay transportation service latest determined are display on an image plane.

Figure 16:
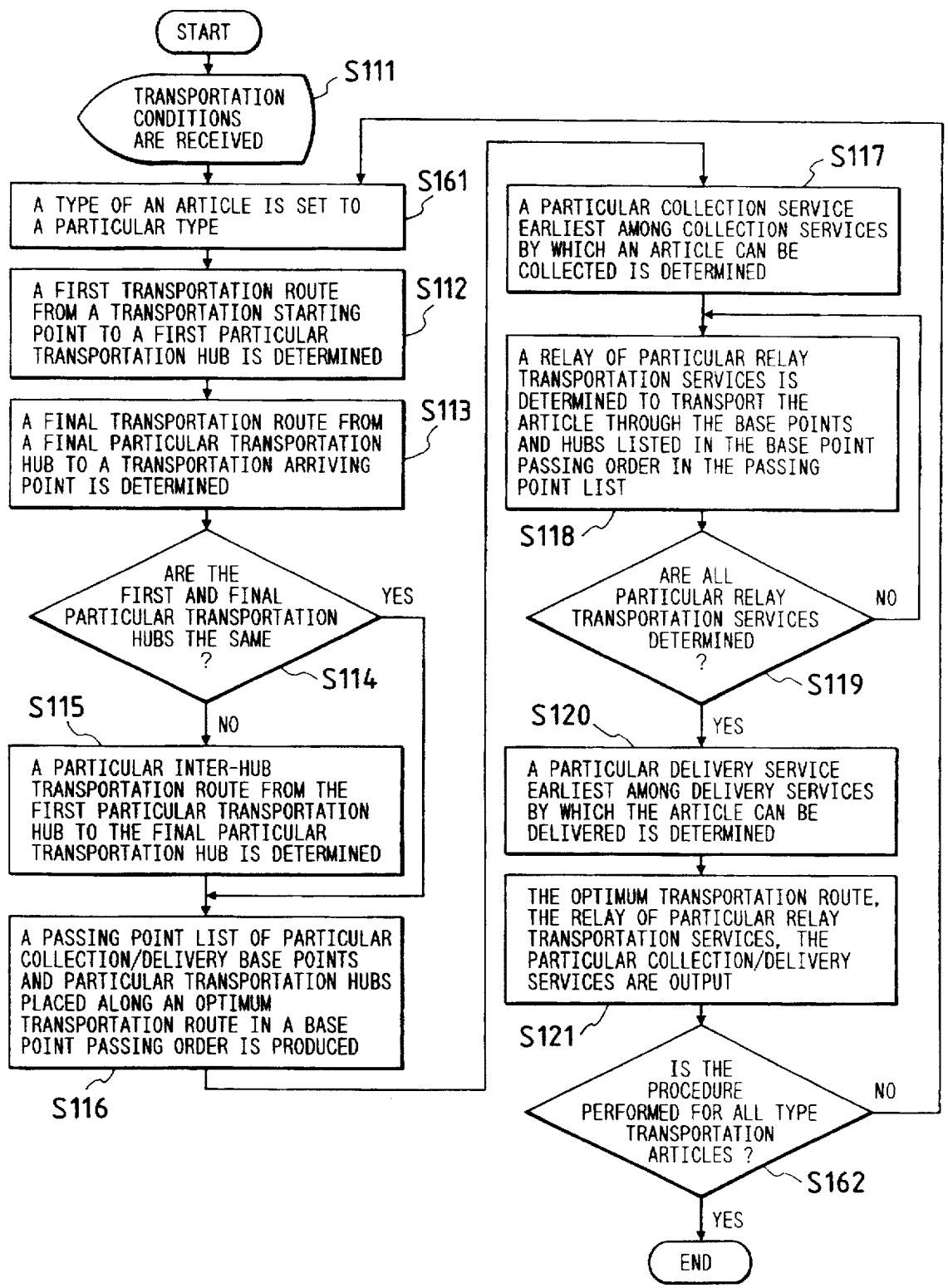
FIG. 16 is a flow chart showing the procedure for determining an optimum transportation route, a series of relay transportation services and transportation arriving time and date for each type transportation article in the transportation route and service determining unit shown in FIG. 1.

Also, in cases where a transportation starting point, a transportation arriving point, a desired transportation starting date and a desired transportation starting time are received by the condition receiving unit 16 on condition that a transportation arriving date, a transportation arriving time and a type of a transportation article are treated as undecided transportation conditions, an optimum transportation route from the transportation starting point to the transportation arriving point, a group of particular relay transportation services connecting from the transportation starting point to the transportation arriving point and transportation arriving date and time are determined for each of various type transportation articles according to a procedure shown in FIG. 16.

As shown in FIG. 16, after the procedure of the step S111 is performed in the same manner as that shown in FIG. 8, a type of the transportation article is set in a step S161 to a particular type for which any transportation route is not determined. Thereafter, the procedure from the step S112 to the step S121 is performed in the same manner as that shown in FIG. 8 to determine and display an optimum transportation route from the transportation starting point to the transportation arriving point, a group of particular relay transportation services connecting from the transportation starting point to the transportation arriving point and transportation arriving date and time to the transportation arriving point for the transportation article of which the type is set to the particular type in the step S161. Thereafter, it is judged in a step S162 whether or not the procedure is performed for all type transportation articles. In cases where the procedure is not performed for all type transportation articles, the procedure for another particular type transportation article is performed in the steps S161, and 111 to 121. In contrast, in cases where the procedure is performed for all type transportation articles, the procedure is finished.

In the determining unit 18, as shown in FIG. 17, the transportation conditions, the optimum transformation route, the series of particular relay transportation services, the particular collection and delivery services and the transportation arriving date and time are display on an image plane for each type transportation article.

Accordingly, an optimum transportation route can be reliably and efficiently determined in a transportation network such as a large-scaled physical distribution network.

Also, even though various pieces of transportation information required to manage the article transportation in the large-scaled physical distribution network are not provided by an operator, the transportation information can be automatically presented.

Having illustrated and described the principles of the present invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. A transportation route determining method, comprising the steps of:

constructing a transportation network by arranging a plurality of collection/delivery base points for respectively collecting or delivering a transportation article, a plurality of relay base points for respectively relaying the transportation article to transport the transportation article from a collection/delivery base point to another collection/delivery base point and a plurality of relay transportation services for respectively executing the transportation of the transportation article from one collection/delivery base point or relay base point to another collection/delivery base point or relay base point;

hierarchically classifying the collection/delivery base points, the relay base points and the relay transportation services of the transportation network into pieces of transportation network information in a hierarchy structure;

preparing a plurality of transportation restrictions for article transportation in the transportation network;

preparing transportation rules determined according to experimental knowledge;

preparing a plurality of route rules determined according to business knowledge, each route rule indicating a relay route connecting three or more relay base points;

determining a transportation route from a transportation starting point selected from among the collection/delivery base points to a transportation arriving point selected from the collection/delivery base points according to the transportation network information on condition that the route rules, the transportation restrictions and the transportation rules are satisfied; and outputting the transportation route.

2. A method according to claim 1 wherein the step of classifying the collection/delivery base points comprises the steps of:

classifying the collection/delivery base points, the relay base points and the relay transportation services of the transportation network into collection/delivery layer information relating to collection and delivery of the transportation article at the collection/delivery base points, general transportation layer information relating to the transportation between each of the relay base points and each of the collection/delivery base points, inter-hub transportation layer information relating to the transportation between the relay base points and managing layer information relating to the management of the relay base points performed while considering correlations among the relay base points;

constructing the hierarchy structure composed of a collection/delivery layer, a general transportation layer, an inter-hub transportation layer and a managing layer hierarchically placed each other;

hierarchically arranging the collection/delivery layer information at the collection/delivery layer;

hierarchically arranging the general transportation layer information at the general transportation layer;

hierarchically arranging the inter-hub transportation layer information at the inter-hub transportation layer;

hierarchically arranging the managing layer information at the managing layer;

treating the collection/delivery layer information hierarchically arranged at the collection/delivery layer as partial pieces of transportation network information;

treating the general transportation layer information hierarchically arranged at the general transportation layer as partial pieces of transportation network information;

treating the inter-hub transportation layer information hierarchically arranged at the inter-hub transportation layer as partial pieces of transportation network information; and treating the managing layer information hierarchically arranged at the managing layer as partial pieces of transportation network information.

3. A method according to claim 1, the transportation route determining method further comprising the steps of:

preparing schedule information relating to a schedule of the relay transportation services; and determining a relay of particular relay transportation services, by which a particular transportation article is transported from the transportation starting point to the transportation arriving point along the transportation route determined, selected from the relay transportation services of the transportation network according to the schedule information on condition that the transportation restrictions are satisfied.

4. A method according to claim 3, the transportation route determining method further comprising the steps of:

adding a plurality of collection services for each of the collection/delivery base points and a plurality of delivery services for each of the collection/delivery base points to the transportation network;

preparing collection/delivery schedule information relating to a schedule of the collection services and a schedule of the delivery services;

determining a particular collection service from the collection services according to the collection/delivery schedule information on condition that the transportation restrictions are satisfied;

determining a particular delivery service from the delivery services according to the collection/delivery schedule information on condition that the transportation restrictions are satisfied;

obtaining a collection time of the particular article executed by the particular collection service according to the collection/delivery schedule information; and obtaining a delivery time of the particular article executed by the particular delivery service according to the collection/delivery schedule information.

5. A method according to claim 1 wherein the step of preparing a plurality of route rules comprises the steps of:

preparing schedule information relating to a schedule of the relay transportation services; and producing the route rules according to the schedule information on condition that the transportation rules are satisfied.

6. A method according to claim 5 in which the step of producing the route rules comprising the steps of:

reading out pieces of relay schedule information, relating to a schedule of relay transportation services respectively connecting a pair of relay base points, from the schedule information;

determining a plurality of relay routes respectively produced by connecting two or more relay transportation services in series according to the relay schedule information;

removing one or more particular relay routes, respectively passing the same relay base point two or more times, from the relay routes;

removing one or more other particular relay routes not satisfying the transportation rules from the relay routes; and storing the relay routes as the route rules.

7. A method according to claim 1, the transportation route determining method further comprising the steps of:

preparing schedule information relating to a schedule of the relay transportation services;

inputting the transportation starting point, the transportation arriving point and a desired transportation starting date at the transportation starting point and a desired transportation starting time at the transportation starting point;

determining a relay of particular relay transportation services, by which a particular transportation article is transported from the transportation starting point to the transportation arriving point along the transportation route determined, selected from the relay transportation services of the transportation network according to the schedule information on condition that the transportation restrictions are satisfied and the transportation of the particular transportation article is started at or after the desired transportation starting date and time; and determining a transportation arriving date and a transportation arriving time at which the particular transportation article arrives at the transportation arriving point.

8. A method according to claim 7 wherein the step of determining a transportation route includes the step of:

determining a particular transportation route for each of various types of particular transportation articles as the transportation route, the step of determining a relay of particular relay transportation services includes the step of:

determining the relay of particular relay transportation services along the particular transportation route determined for each of the various types of particular transportation articles, and the step of determining a transportation arriving date includes the step of:

determining the transportation arriving date and the transportation arriving time at which each of the various types of particular transportation articles arrives at the transportation arriving point.

9. A method according to claim 1, the transportation route determining method further comprising the steps of:

preparing schedule information relating to a schedule of the relay transportation services;

inputting the transportation starting point, the transportation arriving point and a desired transportation arriving date at the transportation arriving point and a desired transportation arriving time at the transportation arriving point;

determining a relay of particular relay transportation services, by which a particular transportation article is transported from the transportation starting point to the transportation arriving point along the transportation route determined, selected from the relay transportation services of the transportation network according to the schedule information on condition that the transportation restrictions are satisfied and the particular transportation article arrives at or before the desired transportation arriving date and time; and determining a transportation starring date and a transportation starting time at which the transportation of the particular transportation article at the transportation starring point is started.

10. A method according to claim 1, the transportation route determining method further comprising the steps of:

preparing schedule information relating to a schedule of the relay transportation services; and setting a desired transportation period, and the step of determining a transportation route comprises the steps of:

determining one or more particular points as the transportation arriving point from a group of the collection/delivery base points and the relay base points, to which a particular transportation article is transported from the transportation starting point within the desired transportation period, according to the transportation network information, the schedule information and the transportation restrictions; and determining one or more particular transportation routes from the transportation starting point to the particular points as the transportation route according to the transportation network information on condition that the route rules are satisfied.

11. A method according to claim 1, the transportation route determining method further comprising the steps of:

preparing schedule information relating to a schedule of the relay transportation services; and setting a desired transportation period, and the step of determining a transportation route comprises the steps of:

determining one or more particular points as the transportation starting point from a group of the collection/delivery base points and the relay base points, from which a particular transportation article is transported to the transportation arriving point within the desired transportation period, according to the transportation network information, the schedule information and the transportation restrictions; and determining one or more particular transportation routes from the particular points to the transportation arriving point as the transportation route according to the transportation network information on condition that the route rules are satisfied.

12. A transportation route determining system, comprising:

transportation network storing means for storing transportation network information indicating a transportation network in which a plurality of collection/delivery base points for respectively collecting or delivering a transportation article, a plurality of relay base points for respectively relaying the transportation article to transport the transportation article from a collection/delivery base point to another collection/delivery base point and a plurality of relay transportation services for respectively executing the transportation of the transportation article from one collection/delivery base point or relay base point to another collection/delivery base point or relay base point are hierarchically arranged to form a hierarchy structure;

knowledge storing means for storing a plurality of transportation restrictions for article transportation in the transportation network, a plurality of route rules determined according to business knowledge and transportation rules determined according to experimental knowledge, each route rule indicating a relay route connecting three or more relay base points;

condition receiving means for receiving one or more transportation conditions in the transportation network;

transportation route determining means for determining a transportation route from a transportation starting point corresponding to one of the collection/delivery base points to a transportation arriving point corresponding to another collection/delivery base point in the transportation network according to the transportation conditions received by the condition receiving means and the transportation network information stored in the transportation network storing means on condition that the transportation restrictions, the transportation rules and the route rules stored in the knowledge storing means are satisfied; and determined result outputting means for outputting the transportation route determined by the transportation route determining means.

13. A system according to claim 12 wherein the transportation network storing means comprises:

collection/delivery layer field for holding collection/delivery layer information relating to collection and delivery of the transportation article at the collection/delivery base points as partial pieces of transportation network information;

general transportation layer field for holding general transportation layer information relating to the transportation between each of the relay base points and each of the collection/delivery base points as partial pieces of transportation network information;

inter-hub transportation layer field for holding inter-hub transportation layer information relating to the transportation between the relay base points; and managing layer field for holding managing layer information relating to the management of the relay base points performed while considering correlations among the relay base points.

14. A system according to claim 12, further comprising:

transportation schedule storing means for storing schedule information relating to a schedule of the relay transportation services respectively connecting a pair of relay base points;

knowledge acquiring means for determining a plurality of relay routes respectively produced by connecting two or more relay transportation services stored in the transportation network storing means in series according to the schedule information stored in the transportation schedule storing means, removing one or more particular relay routes, respectively passing the same relay base point two or more times, from the relay routes, removing one or more other particular relay routes not satisfying the transportation rules stored in the knowledge storing means from the relay routes, and acquiring the relay routes, the relay routes being stored in the knowledge storing means as the route rules.

15. A system according to claim 12, further comprising transportation schedule storing means for storing schedule information relating to a schedule of the relay transportation services respectively connecting a pair of relay base points, the transportation conditions received by the condition receiving means are the transportation starting point, the transportation arriving point and a desired transportation starting date at the transportation starting point and a desired transportation starting time at the transportation starting point, a relay of particular relay transportation services, by which a particular transportation article is transported along the transportation route determined, is determined from the relay transportation services of the transportation network by the transportation route determining means according to the schedule information stored in the transportation schedule storing means on condition that the transportation restrictions stored in the knowledge storing means are satisfied and the transportation of the particular transportation article is started at or after the desired transportation starting date and time, and the relay of particular relay transportation services is output by the determining result outputting means.

* * * * *